(12) United States Patent
Xie et al.

(10) Patent No.: US 7,399,953 B2
(45) Date of Patent: Jul. 15, 2008

(54) LIGHT SOURCE CONTROL IN OPTICAL POINTING DEVICE

(75) Inventors: Tong Xie, San Jose, CA (US); Ramakrishna Kakarala, Santa Clara, CA (US); Vincent C. Moyer, Milpitas, CA (US)

(73) Assignee: Avago Technologies ECBU IP Pte Ltd, Singapore (SG)

( * ) Notice: Subject to any disclaimer, the term of this patent is extended or adjusted under 35 U.S.C. 154(b) by 181 days.

(21) Appl. No.: 11/123,814

(22) Filed: May 6, 2005

(65) Prior Publication Data

US 2006/0255152 A1    Nov. 16, 2006

(51) Int. Cl.
  *G06M 7/00* (2006.01)
  *H01J 40/14* (2006.01)
(52) U.S. Cl. .................. 250/221; 235/455; 345/157; 345/165; 345/166
(58) Field of Classification Search ................ 235/455; 345/166, 157, 165; 250/221
See application file for complete search history.

(56) References Cited

U.S. PATENT DOCUMENTS

| | | | |
|---|---|---|---|
| 3,873,179 A * | 3/1975 | Burke | 359/7 |
| 4,794,384 A | 12/1988 | Jackson | |
| 4,807,166 A * | 2/1989 | Zalenski | 345/166 |
| 5,045,843 A * | 9/1991 | Hansen | 345/158 |
| 5,600,116 A * | 2/1997 | Seo et al. | 235/455 |
| 5,612,529 A * | 3/1997 | Coleman | 235/455 |
| 5,786,804 A | 7/1998 | Gordon | |
| 5,907,152 A | 5/1999 | Dandliker et al. | |
| 6,172,354 B1 | 1/2001 | Adan et al. | |
| 6,281,882 B1 | 8/2001 | Gordon et al. | |
| 6,303,924 B1 * | 10/2001 | Adan et al. | 250/221 |
| 6,455,840 B1 * | 9/2002 | Oliver et al. | 250/222.1 |
| 6,661,410 B2 * | 12/2003 | Casebolt et al. | 345/173 |
| 7,064,311 B2 * | 6/2006 | Jung et al. | 250/205 |
| 2002/0075526 A1 * | 6/2002 | Mori | 358/475 |
| 2003/0039294 A1 * | 2/2003 | Ueki et al. | 372/96 |
| 2003/0061524 A1 | 3/2003 | Casebolt et al. | |
| 2003/0103037 A1 | 6/2003 | Rotzoll | |
| 2004/0129861 A1 | 7/2004 | Jung et al. | |
| 2004/0160411 A1 | 8/2004 | Yang | |

(Continued)

FOREIGN PATENT DOCUMENTS

CN    1607544    4/2005

(Continued)

OTHER PUBLICATIONS

Search Report dated Aug. 31, 2006 for Patent Application in Great Britain No. 0609028.6.

(Continued)

*Primary Examiner*—Georgia Y. Epps
*Assistant Examiner*—Seung C. Sohn

(57) ABSTRACT

An optical pointing device includes a light source configured to respond to a drive current to provide at least partially coherent light to illuminate an imaging surface to thereby generate reflected images. A navigation sensor is configured to generate digital images based on the reflected images, and generate movement data based on the digital images that are indicative of relative motion between the imaging surface and the optical pointing device. A light source driver is configured to provide the drive current to the light source. A drive current controller is configured to calibrate the drive current based on selected digital images.

23 Claims, 5 Drawing Sheets

U.S. PATENT DOCUMENTS

| | | |
|---|---|---|
| 2005/0012022 A1 | 1/2005 | Lin |
| 2005/0068300 A1 | 3/2005 | Wang et al. |
| 2005/0078085 A1 | 4/2005 | Casebolt et al. |
| 2005/0162391 A1 | 7/2005 | Lin |
| 2005/0168444 A1 | 8/2005 | Lin et al. |
| 2005/0195169 A1 | 9/2005 | Lin |
| 2006/0132443 A1* | 6/2006 | Chien Wu ............ 345/166 |
| 2006/0169021 A1* | 8/2006 | Silverstein ............ 73/1.37 |
| 2006/0187209 A1* | 8/2006 | Lai et al. ............ 345/166 |

FOREIGN PATENT DOCUMENTS

| | | |
|---|---|---|
| EP | 1096778 | 4/2003 |
| EP | 1531386 | 5/2005 |
| GB | 2397123 | 7/2004 |
| GB | 2408325 | 5/2005 |
| GB | 2421305 | 6/2006 |
| WO | WO 2005/006168 | 1/2005 |

OTHER PUBLICATIONS

Search Report dated Feb. 26, 2007 for Patent Application in Great Britain No. 0609028.6.

* cited by examiner

LIGHT SOURCE CONTROL IN OPTICAL POINTING DEVICE

BACKGROUND

The use of a hand operated pointing device for use with a computer and its display has become almost universal. One form of the various types of pointing devices is the conventional (mechanical) louse, used in conjunction with a cooperating mouse pad. Mechanical mice typically include a rubber-surfaced steel ball that rolls over the mouse pad as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse.

In addition to mechanical types of pointing devices, such as a conventional mechanical mouse, optical pointing devices have also been developed. In one form of optical pointing device, rather than using a moving mechanical element like a ball, relative movement between an imaging surface, such as a finger or a desktop, and an image sensor within the optical pointing device, is optically sensed and converted into movement information.

Electronic image sensors, such as those typically employed in optical pointing devices, are predominantly of two types: charge coupled devices (CCDs) and complimentary metal oxide semiconductor—active pixel sensors (CMOS-APS). Both types of sensors typically contain an array of photodetectors (i.e., pixels), arranged in a pattern. Each individual photodetector operates to output a signal with a magnitude that is proportional to the intensity of light incident on the site of the photodetector. These output signals can then be subsequently processed and manipulated to generate an image that includes a plurality of individual picture elements (pixels), wherein each pixel in the image corresponds with one of the photodetectors (i.e., pixels) in the image sensor.

One form of optical pointing device includes an incoherent light source, such as a light emitting diode (LED), for illuminating an imaging or navigation surface to thereby generate reflected images which are sensed by the image sensor of the optical pointing device. Another form of optical pointing device includes a coherent light source, such as a laser, for illuminating an imaging surface to thereby generate reflective images to be sensed by the image sensor of the optical pointing device. Coherent light source based optical navigation with optical pointing devices can provide better imaging surface coverage and better tracking performance than provided with conventional incoherent light source optical pointing devices.

Coherent light sources, such as lasers, have significantly more stringent eye safety regulation than incoherent light sources, such as LEDs. For example, the International Electro-Technical Commission (IEC) standard defines Class -1 lasers as lasers that are safe under reasonably foreseeable conditions of operation, including the use of optical instruments for intrabeam viewing. In order to meet the Class-1 classification, no eye damage will occur even if someone looked at the laser for an extensive period of time with a magnifier in front of the laser. The maximum optical power output of a Class-1 laser inside an optical pointing device is limited by the IEC standard based on the wavelength of the laser output and the mode of operation of the laser. For example, a single mode vertical cavity surface emitting laser (VCSEL) having a nominal wavelength of 840 nanometers (nm) is defined by the IEC standard to have a peak optical power output less than 700 microwatts ($\mu$W) in a continuous wave (CW) mode to meet the Class-1 classification.

A coherent light source in a optical pointing device needs to provide a sufficient level of light output (i.e., minimum optical power output) to achieve proper exposure of the sensor image. An example minimum optical power output of a typical VCSEL in an optical pointing device is approximately 200 $\mu$W. This minimum optical power output can change with different environmental operating conditions of the optical point device. For example, less light is reflected off surfaces with darker tone and surfaces having larger surface roughness. In order to properly navigate the optical pointing device on these less reflective surfaces, the minimum optical power output from the coherent light source is typically increased. Alternatively, the exposure time of the sensor could be increased to achieve the proper level of exposure of the sensor image. The longer exposure time, however, limits the tracking speed of the optical pointing device.

Thus, the operating window of a coherent light source in an optical pointing device is defined by the minimum optical power output to provide proper exposure of the sensor image and the maximum optical power output of the coherent light source to meet the eye safety specification definition, such as the IEC standard defined Class-1 classification.

In optical pointing devices, coherent light sources, such as lasers, are typically controlled with a current regulating circuit. The current regulating circuit adjusts the optical power output of the coherent light source by varying the drive current provided by a light source driver to the light source. A typical coherent light source (e.g., VCSEL) employed in an optical pointing device is typically extremely sensitive to the drive current, such that a small fluctuation in the drive current provided by the light source driver results in a large change in the optical power output of the coherent light source. A stable and precise current source is preferably provided to the coherent light source in an optical pointing device to accommodate the operating window of the coherent light source.

One form of optical pointing device having a laser light source (e.g., VCSEL) employs a current regulating circuit to control the light source drive to provide a fixed drive current to the laser. In an optical pointing device with such fixed drive current circuitry, the mode of operation and the optical power output of the laser are based on the threshold current and the slope efficiency of the laser. The threshold current of a laser is the minimum drive current which causes the laser to start lazing. The slope efficiency of a laser is the optical power output of the laser versus drive current. VCSELs and other lasers typically employed in optical pointing devices typically have large manufacturing process variations which result in large variations in threshold current and slope efficiency of the lasers. Individual calibration of optical pointing devices is typically used for optical pointing devices with fixed current drive circuitry to ensure that the laser provides eye safe operation and minimal optical power output. Even after individual calibration, the optical power output of the laser can be affected by other parameters, such as laser age and changes in operating temperature conditions.

One form of optical pointing device which overcomes some of the above problems with fixed drive current circuitry includes closed-loop laser drive circuitry. In this form of optical pointing device, a monitoring photo diode is typically employed to continuously monitor the optical power output of the laser and provide feedback to the closed-loop laser drive circuitry. The closed-loop laser drive circuitry can accommodate threshold current and slope efficiency variations in lasers due to manufacturing process variations. In addition, laser age and operating temperature conditions can also be accommodated by the closed-loop laser drive circuitry. Closed-loop laser drive circuitry, however, is difficult and costly to implement. For example, the closed-loop laser drive circuitry employs a costly optical feedback path from the laser to the monitoring photo diode.

One form of optical pointing device includes open-loop laser drive circuitry. In one example process for manufacturing an optical pointing device having open-loop laser drive circuitry, the lasers (e.g., VCSELs) are pre-tested to determine the laser threshold current, slope efficiency, and temperature coefficient. The pre-tested lasers are sorted and grouped accordingly into a finite number of bins. Each bin of lasers is matched to a corresponding open-loop current regulating circuit. The corresponding open-loop current regulating circuit can properly adjust the drive current to the corresponding laser to ensure that the laser operates in its defined operating window to provide minimum optical power output and ensure eye safe operation. While this manufacturing process reliably ensures that the proper operating window of the laser is achieved, the manufacturing process is time intensive and costly. In addition, this manufacturing process typically results in a large percentage of the lasers being non-usable due to the limited compensation range provide by the limited number of selectable open-loop current regulating circuits.

For these and other reasons, there is a need for the present invention.

SUMMARY

One aspect of the present invention provides an optical pointing device including a light source, a navigation sensor, a light source driver, and a drive current controller. The light source is configured to respond to a drive current to provide at least partially coherent light to illuminate an imaging surface to thereby generate reflected images. The navigation sensor is configured to generate digital images based on the reflected images, and generate movement data based on the digital images that is indicative of relative motion between the imaging surface and the optical pointing device. The light source driver is configured to provide the drive current to the light source. The drive current controller is configured to calibrate the drive current based on selected digital images.

DETAILED DESCRIPTION

In the following Detailed Description, reference is made to the accompanying drawings, which form a part hereof, and in which is shown by way of illustration specific embodiments in which the invention may be practiced. In this regard, direc-tional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Figure 1:
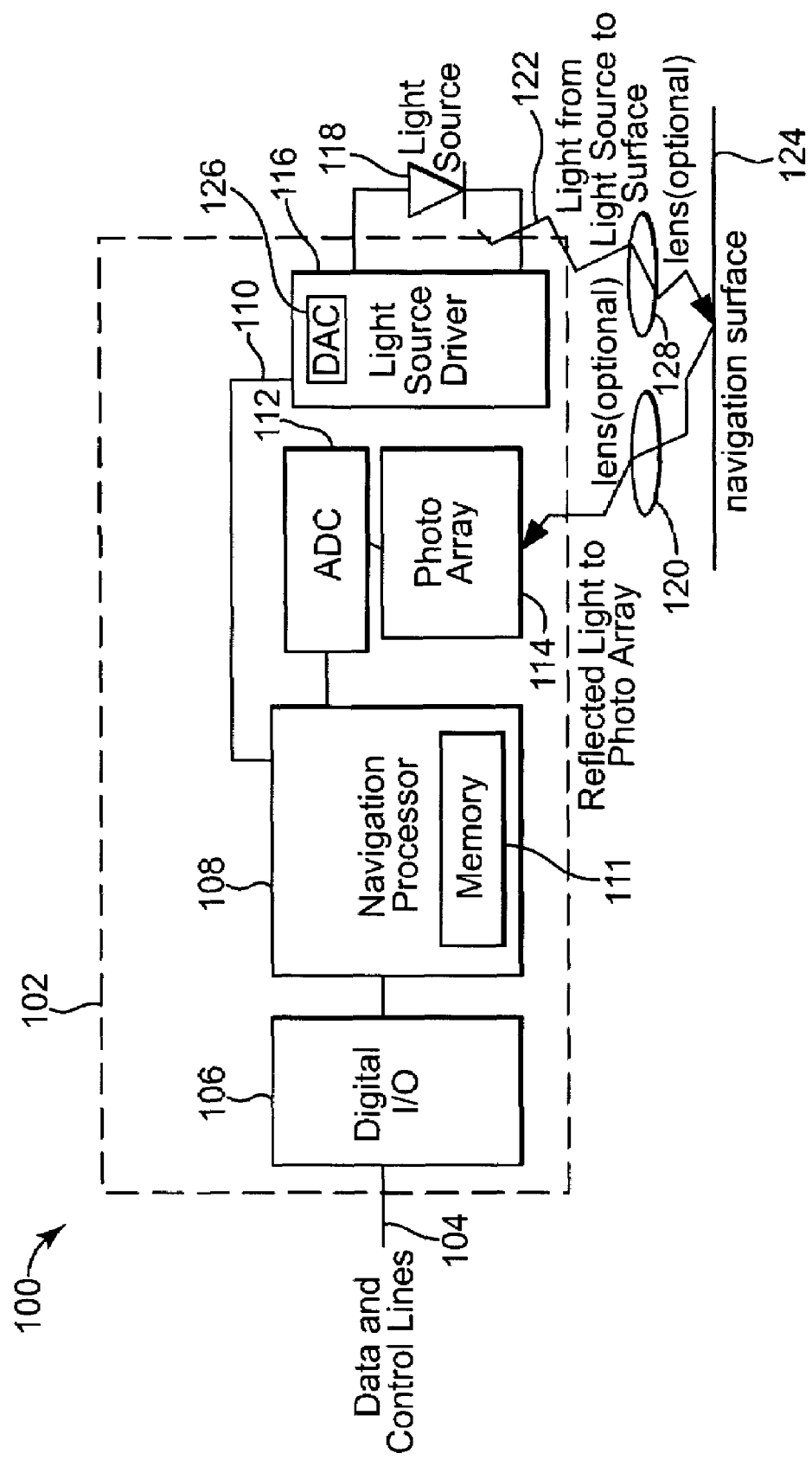
FIG. 1 is a block diagram illustrating major components of an optical pointing device according to one embodiment.

FIG. 1 is a block diagram illustrating major components of an optical pointing device 100 according to one embodiment. Optical pointing device 100 includes an optical navigation sensor integrated circuit (IC) 102, a light source 118, an optional lens 120, and an optional lens 128. Optical navigation sensor 102 includes digital input/output circuitry 106, a navigation processor 108, an analog to digital converter (ADC) 112, a photodetector array (photo array) 114, and light a source driver circuit 116. In one embodiment, optical pointing device 100 is an optical mouse for a desktop personal computer, workstation, portable computer, or other device. In another embodiment, optical pointing device 100 is configured as an optical fingerprint sensing pointing device, or other pointing device.

In operation, according to one embodiment, light source 118 emits light 122 onto a navigation surface 124, which is a desktop or other suitable imaging surface, and reflected images are generated. In one embodiment, light source emits light 122 directed through lens 128 onto navigation surface 124. In one embodiment, light source 118 is a coherent light source or an at least partially coherent light source. In one embodiment, light source 118 is a laser. In one embodiment, light source 118 is a vertical cavity surface emitting laser (VCSEL) diode. In another embodiment, light source 118 is an edge emitting laser diode. In one embodiment, light source 118 comprises a broadband or incoherent light source, such as a light emitting diode (LED), and a narrow band filter which filters the broadband light to provide at least partially coherent light. Light source 118 is controlled by driver circuit 116, which is controlled by navigation processor 108 via a control line 110. In one embodiment, control line 110 is employed by navigation processor 108 to cause driver circuit 116 to be powered on and off, and correspondingly cause light source 118 to be powered on and off.

Reflected light from navigation surface 124 is reflected onto photodetector array 114. In one embodiment, reflected light from surface 124 is directed by lens 120 onto photodetector array 114. Lenses 120 and 128 are referred to as optional lenses because embodiments of optical pointing device 100 which include a light source 118 embodied as a coherent light source, such as a laser, or an at least partially coherent light source, can be embodied without lenses 120 and 128, with both lenses 120 and 128, or with only one of lenses 120 and 128.

Each photodetector in photodetector array 114 provides a signal that varies in magnitude based upon the intensity of light incident on the photodetector. The signals from photodetector array 114 are provided to analog to digital converter 112, which converts the signals into digital values of a suitable resolution (e.g., eight bits). The digital values represent a digital image or digital representation of the portion of the desktop or other navigation surface under optical pointing device 100. The digital values generated by analog to digital converter 112 are output to navigation processor 108. The digital values received by navigation processor 108 are stored as frames within a memory 111.

The overall size of photodetector array 114 is preferably large enough to receive an image having several features. Images of such spatial features produce translated patterns of pixel information as optical pointing device 100 moves over navigation surface 124. The number of photodetectors in array 114 and the frame rate at which their contents are captured and digitized cooperate to influence how fast optical pointing device 100 can be moved across a surface and still be tracked. Tracking is accomplished by navigation processor 108 by comparing a newly captured sample frame with a previously captured reference frame to ascertain the direction and amount of movement.

In one embodiment, navigation processor 108 performs a cross-correlation of sequential frames to determine motion information. In one form of this embodiment, the entire content of one of the frames is shifted by navigation processor 108 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial referred to as a null shift is also used. In an example operation, after each trial shift, those portions of the frames that overlap each other are subtracted by navigation processor 108 on a pixel by pixel basis, and the resulting differences are preferably squared and then summed to form a measure of similarity (correlation) within that region of overlap. In one embodiment, larger trial shifts (e.g., two over and one down) may be used.

The trial shift with the least difference (i.e., greatest correlation) can be taken as an indication of the motion between the two frames. That is, it provides raw movement information that may be scaled and or accumulated to provide movement information (e.g., $\Delta X$ and $\Delta Y$) of a convenient granularity and at a suitable rate of information exchange, which is provided to a host device by digital input/output circuitry 106 via data and control lines 104. Optical pointing device 100 is also configured to receive data and control signals from a host device via data and control lines 104.

In one embodiment, light source 118 is embodied in a laser (e.g., VCSEL) which is operated in a pulse mode instead of in a continuous wave (CW) mode. Instead of having light source 118 on continuously, light source 118 is turned off when navigation sensor 102 is not integrating the sensed image. In other words, in this embodiment, light source 118 (e.g., VCSEL) is synchronized to the frame rate of navigation sensor 102 via navigation processor 108 which controls light source driver 116 to provide pulsed drive current to light source 118.

In a conventional optical pointing device having a laser operated in CW mode, the laser has a 100% duty cycle which significantly limits the peak optical power output of the laser. For example, a single mode VCSEL with a nominal wavelength of 840 nm is defined by the IEC standard to have a peak optical power output less than 700 μW in the CW mode to meet the Class-1 classification.

The IEC standard considers a variety of criteria that pulsed systems must meet, such as the average pulse train power is less than or equal to the CW mode limit; the energy in a single pulse is less than a single pulse energy limit; and the average energy per pulse in a train of pulses is less than the single pulse energy limit reduced by a frequency factor. For clarity, the following example only considers the IEC standard average pulse train power criteria for an example embodiment of optical pointing device 100 where light source 118 comprises a single mode VCSEL with a nominal wavelength of 840 nm driven via navigation processor 108 and light source driver 116 in a pulse mode synchronized to the frame rate of navigation sensor 102 to be at an illustrative example 18% duty cycle with a 400 microsecond (μs) pulse width. In this example embodiment of optical pointing device 100, the VCSEL light source 118 pulsed at a 18% duty cycle is permitted to have a peak optical power output of 3.9 mW to achieve the IEC standard Class-1 average pulse train power classification. In this example embodiment, the peak optical power output of the VCSEL light source 118 as limited by the IEC standard Class-1 average pulse train power classification is significantly greater than the conventional optical pointing device having a VCSEL operating in the CW mode. However, when designing an optical pointing device, other factors could limit the peak optical power, such as the IEC standard defined single pulse energy limit and frequency factor.

The above laser pulsing technique significantly increases the operating range of the laser light source 118, which thereby significantly relaxes the requirements on the open-loop current drive circuit and the laser selection criteria. For example, the sorting and binning manufacturing process discussed in the Background section for optical pointing devices having open-loop laser drive circuitry operating in CW mode is not needed with the embodiment of optical pointing device 100 which pulses laser light source 118 in synchronization with the frame rate of navigation sensor 102.

Figure 2:
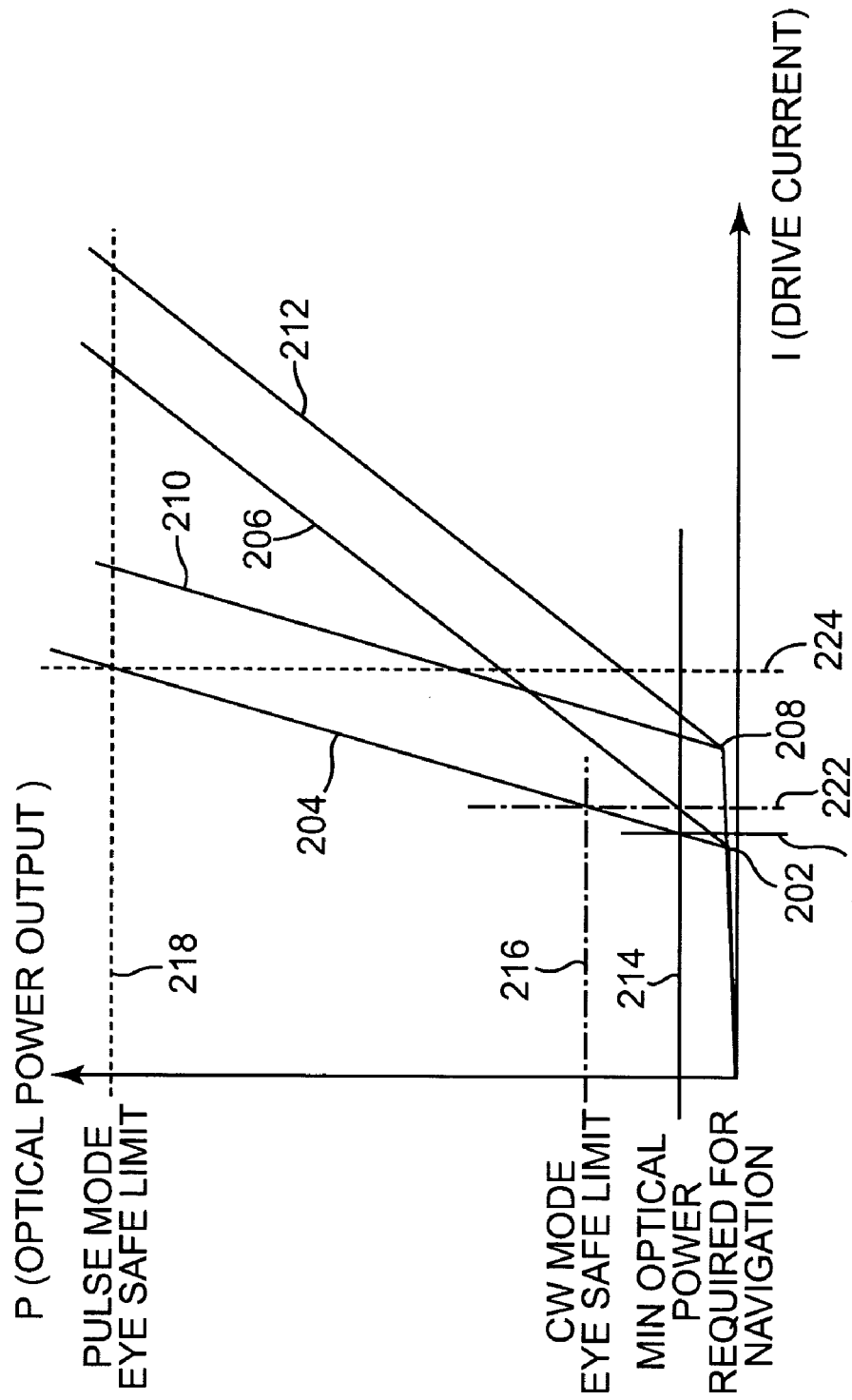
FIG. 2 is a graph diagram which plots optical power output versus drive current for a variety of VCSELs.

FIG. 2 is a graph diagram which plots optical power output versus drive current for a variety of VCSELs. A first VCSEL has a threshold current indicated at 202 and slope efficiency indicated at 204. A second VCSEL has a threshold current indicated at 202 and a slope efficiency indicated at 206. A third VCSEL has a threshold current indicated at 208 and a slope efficiency indicated at 210. A fourth VCSEL has a threshold current indicated 208 and a slope efficiency indicated at 212.

A minimum optical power required for navigation is indicated at 214. A CW mode eye safe optical power limit is indicated at 216. A pulse mode eye safe optical power limit is indicated at 218.

In the example embodiment illustrated in FIG. 2, a VCSEL operated in the CW mode has a current operating range between a low current limit indicated at 220 and a high current limit indicated at 222 to achieve both the CW mode eye safe optical power limit indicated at 216 and the minimum optical power required for navigation indicated at 214. Assuming a single threshold current 202 for clarity, only VCSELs with slope efficiencies between the range defined by the first VCSEL with the threshold current indicated at 202 and the slope efficiency indicated at 204 and the second VCSEL with a threshold current indicated at 202 and the slope efficiency indicated at 206 can be employed in this example CW mode operation. There exist other combinations of threshold current and slope efficiency which would meet the minimum optical power required for navigation. The third VCSEL with the threshold current indicated at 208 and the slope efficiency indicated at 210 and the fourth VCSEL with the threshold current indicated at 208 and the slope efficiency indicated at 212 will not achieve the minimum optical power required for navigation indicated at 214 using the same laser drive circuitry.

In the example embodiment illustrated in FIG. 2, a VCSEL light source pulsed in synchronization with the frame rate of the navigation sensor is permitted to have the pulse mode eye safe optical power limit indicated at 218. As a result, the allowed pulse mode current operating range is significantly widened between the low current limit indicated at 220 and a high current limit indicated at 224. The widened current operating range permits all VCSELs with a threshold current and slope efficiency within the range defined by all four VCSELS plotted in FIG. 2 to be employed in this example pulse mode operation.

In one embodiment, navigation processor 108 performs a self-calibration process to determine an appropriate level of drive current to be provided by light source driver 116 to light source 118 (e.g., a laser, such as a VCSEL). In one embodiment, the self-calibration process is controlled by software stored in memory 111 of navigation processor 108.

In one embodiment of the self-calibration process, navigation processor 108 provides a digital value representing a desired drive current for light source 118 to a digital to analog converter (DAC) 126 in light source driver 116. DAC 126 converts the digital value to an analog drive current which is provided to light source 118 by light source driver 116. In one embodiment of the self-calibration process, after optical pointing device 100 is reset (e.g., when a computer system is turned on or rebooted), an initial self-calibration process repetitively cycles through all available drive current values until one of the drive current values produces a suitable image derived from the light reflected from navigation surface 124 onto photodetector array 114. In one embodiment, the initial self-calibration process repetitively cycles through all drive current values from a minimum possible drive current value to a maximum possible drive current value until one of the drive current values produces a suitable image. In one embodiment, the initial self-calibration process repetitively cycles through all drive current values from a maximum possible drive current value to a minimum possible drive current value until one of the drive current values produces a suitable image. In one example embodiment, a suitable range of minimal possible drive current values to maximum possible drive current values is approximately 2 milliamps to approximately 11 milliamps. However, other embodiments include a variety of suitable available drive current values.

In one embodiment, the initial self-calibration process after reset produces an estimate of the drive current that is above the current threshold of the laser. Nonetheless, the estimate of drive current can be higher than necessary or possibly lower than desirable if navigation surface 124 is very dark. Therefore, in one embodiment navigation processor 108 also performs a recalibration process. In one embodiment, the recalibration process is performed after a suitable time that the optical pointing device has been at rest which is selected to avoid disrupting the user of the optical pointing device. In one example embodiment, the recalibration process performed by navigation processor 108 is started after optical pointing device 100 has been at rest for a reasonably long period of time, such as approximately 10 minutes or other suitable time.

One embodiment of the recalibration process performed by navigation processor 108 is similar to the initial self-calibration process and cycles through the range of available drive current values until a drive current value produces a suitable image derived from the light reflected from navigation surface 124 onto photodetector array 114. In one embodiment, the recalibration process cycles through the range of available drive current values and if none of the drive current values produces a suitable image, the recalibration process is terminated and the drive current is set to the previous drive current value taken from when the recalibration process was entered.

In one embodiment, navigation processor 108 also performs an operating mode adjustment of the drive current provided by light source driver 116 to light source 118. This operating mode adjustment reduces the drive current provided by light source driver 116 to light source 118 when light source driver 116 is providing drive current to light source 118 which produces an image derived from the light reflected from navigation surface 124 onto photodetector array 114 which effectively saturates navigation sensor 102. In one embodiment of this operating mode adjustment, the drive current is reduced by a step current value if the automatic exposure control is at minimum and the pixels of photodetector array 114 are producing an image that maximizes the output of ADC 112, such that the digital image provided to navigation processor 108 by ADC 112 has its pixels saturated.

Figure 3:
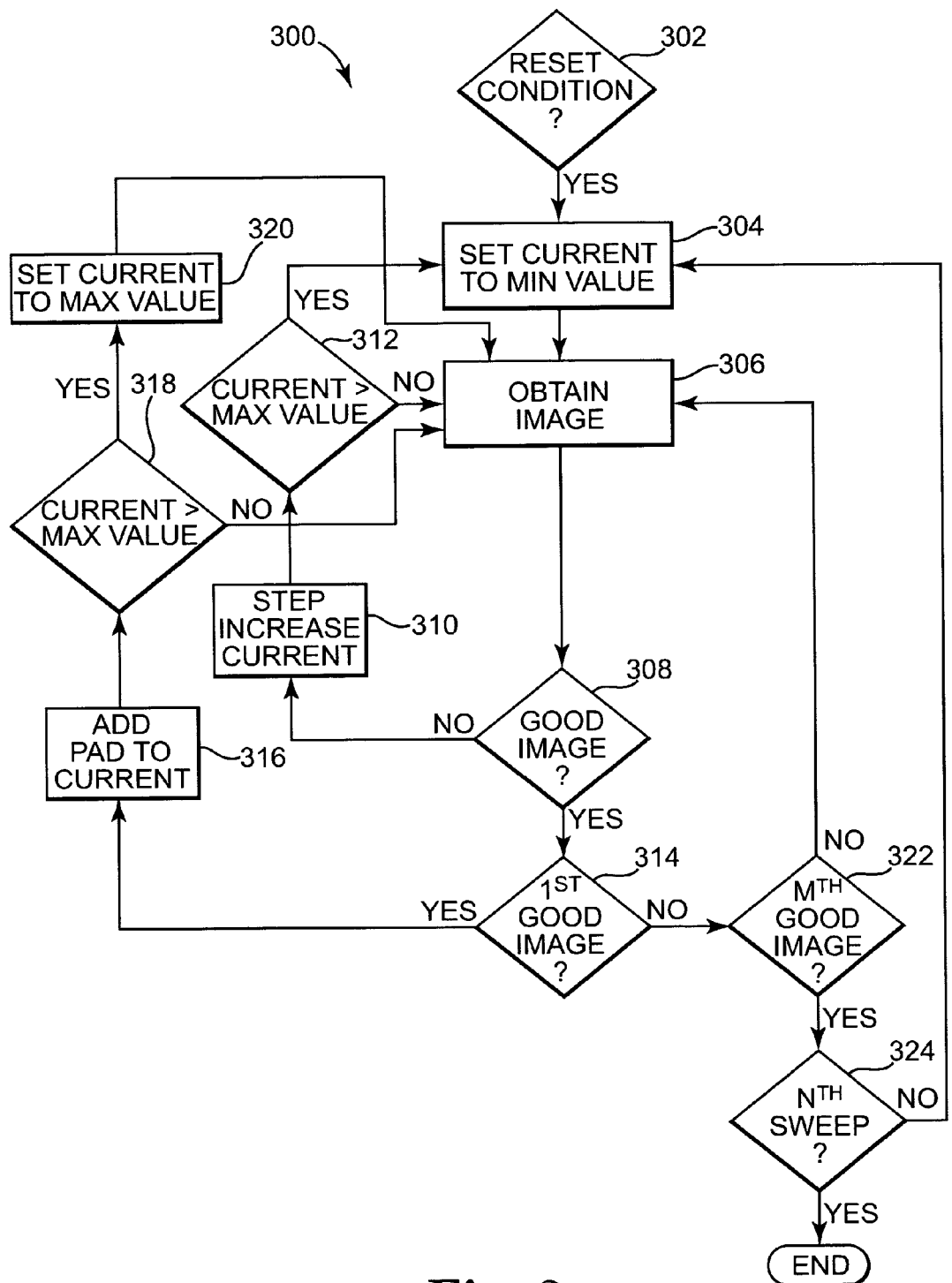
FIG. 3 is a flow diagram illustrating one embodiment of an initial self-calibration process for providing drive current to a light source in an optical pointing device.

One embodiment of an initial self-calibration process performed by navigation processor 108 is illustrated generally at 300 in FIG. 3. At 302, the initial self-calibration process is started when a reset condition occurs in navigation sensor IC 102, such as starting up of a computer, rebooting a computer, installing batteries in a battery powered optical pointing device, and other reset conditions. At 304, after the reset condition is detected at 302, the light source 118 drive current is set to a minimum current value.

At 306, a digital image is obtained with the minimum current value. The minimum current value produces light 122 which is reflected off navigation surface 124 onto photodetector array 114. As described above, photodetector array 114 provides signals to ADC 112 which vary in magnitude based upon the intensity of light incident on the corresponding photodetectors. ADC 112 converts the signals into digital values representing a digital image which are provided to navigation processor 108.

At 308, navigation processor 108 determines if the digital image provided by ADC 112 is a good image. In one embodiment, this determination is based on two measures of image quality, which can be derived from the pixels in the image array stored in memory 111.

In one embodiment, the first measure of image quality is referred to as a navigation suitability measurement. Navigation suitability relates to the number of identifiable features in the image. Navigation suitability can be determined by applying a suitable high-pass filter to the image. One example suitable high-pass filter is a Laplacian filter. The number of pixels in the image array where the high-pass filter output exceeds a navigation suitability threshold is an indication of surface quality for navigation (i.e., navigation suitability). The navigation suitability measurement is typically zero or very low when optical pointing device 100 (e.g., an optical mouse), is lifted, because the image of the navigation surface 124 below optical pointing device 100 is out of focus.

The drive current provided by light source driver 116 to light source 118 typically cannot be set when optical pointing device 100 is lifted, because the obtain images are typically either too dark for navigation or influenced by ambient light. Thus, in one embodiment, navigation processor 108 compares the navigation suitability measurement to a navigation suitability threshold value to determine when optical pointing device 100 is on or very near a surface. In this embodiment, if the navigation suitability measurement is less than the navigation suitability threshold value, the image is determined to be a bad image.

The navigation suitability measurement can also be high due to noise, because noise can have significant high-frequency components. Therefore, in one embodiment, a second measure of image quality employed at 308 is a measured maximum pixel value in the obtained image. In one embodiment, if the measured maximum pixel value in the obtained image is less than a maximum pixel threshold value, the obtained image is determined to be a bad image.

In one embodiment, if the either the navigation suitability measurement of the obtained image is less than the navigation suitability threshold value or the maximum pixel value measurement of the obtained image is less than the maximum pixel threshold value, the obtained image is determined to be a bad image at 308 and initial self-calibration process 300 proceeds to 310. At 310, the drive current value is increased by a step current value. One example suitable step current value is approximately 0.3475 milliamps. However, other embodiments include a variety of suitable step current values. At 312, if the increased drive current value is greater than a maximum current value, process 300 returns to 304 and the drive current is set to the minimum current value and process 300 proceeds to 306 to obtain an image with the minimum current value. At 312, if the drive current value is less than or equal to the maximum current value, process 300 proceeds to 306 to obtain an image with the increased drive current.

At 308, if neither the measured navigation suitability of the obtained image is less than the navigation suitability threshold value nor the measured maximum pixel value of the obtained image is less than the maximum pixel value, the obtained image is determined to be a good image and process 300 proceeds to 314.

At 308 in other embodiments, other pixel statistics other than or in addition to the measured maximum pixel value of the digital image can be employed to measure image quality to determine if the obtained image is a good image, such as a measured average pixel value of the digital image, a measured minimum pixel value of the digital image, and/or a measured pixel ratio value of the digital image.

At 314, navigation processor 108 determines if the good image is the first good image. If the image is the first good image, at 316, the drive current value is set to the drive current plus a current pad value to avoid just clearing the threshold current of light source 118. At 318, navigation processor 108 determines if the new drive current value set at 316 is greater than the maximum current value. If the drive current value is greater than the maximum current value, at 320, the drive current is set to the maximum current value and process 300 returns to 306 to obtain an image with the maximum current value. If the drive current value is less than or equal to the maximum current value, process 300 returns to 306 to obtain an image with the padded drive current value.

If at 314, navigation processor 108 determines that the good image is not the first good image, process 300 continues to 322, where navigation processor 108 determines if the good image is the $M^{th}$ good image. If at 322, the good image is not the $M^{th}$ good image, process 300 returns to 306 to obtain an image with the drive current. If at 322, the good image is the $M^{th}$ good image, process 300 proceeds to 324, where navigation processor 108 determines if there are N consecutive sweeps of setting the drive current from the minimum current value to a suitable high current value which yields M consecutive good images. The N sweeps are counted after the first successful sweep obtains M good images. If at 324, process 300 has completed N sweeps, process 300 ends. If process 300 has not been completed N sweeps, process 300 returns to 304.

The above described embodiment of initial self-calibration process 300 repetitively cycles through all available drive current values until one of the drive current values produces a suitable image by repetitively cycling through all drive current values from a minimum possibly drive current value to a maximum possible drive current value. Other embodiments of an initial self-calibration process can cycle through all available drive current values in other ways, such as from a maximum possible drive current value to a minimum possible drive current value until one of the drive current values produces a suitable image.

Figure 4:
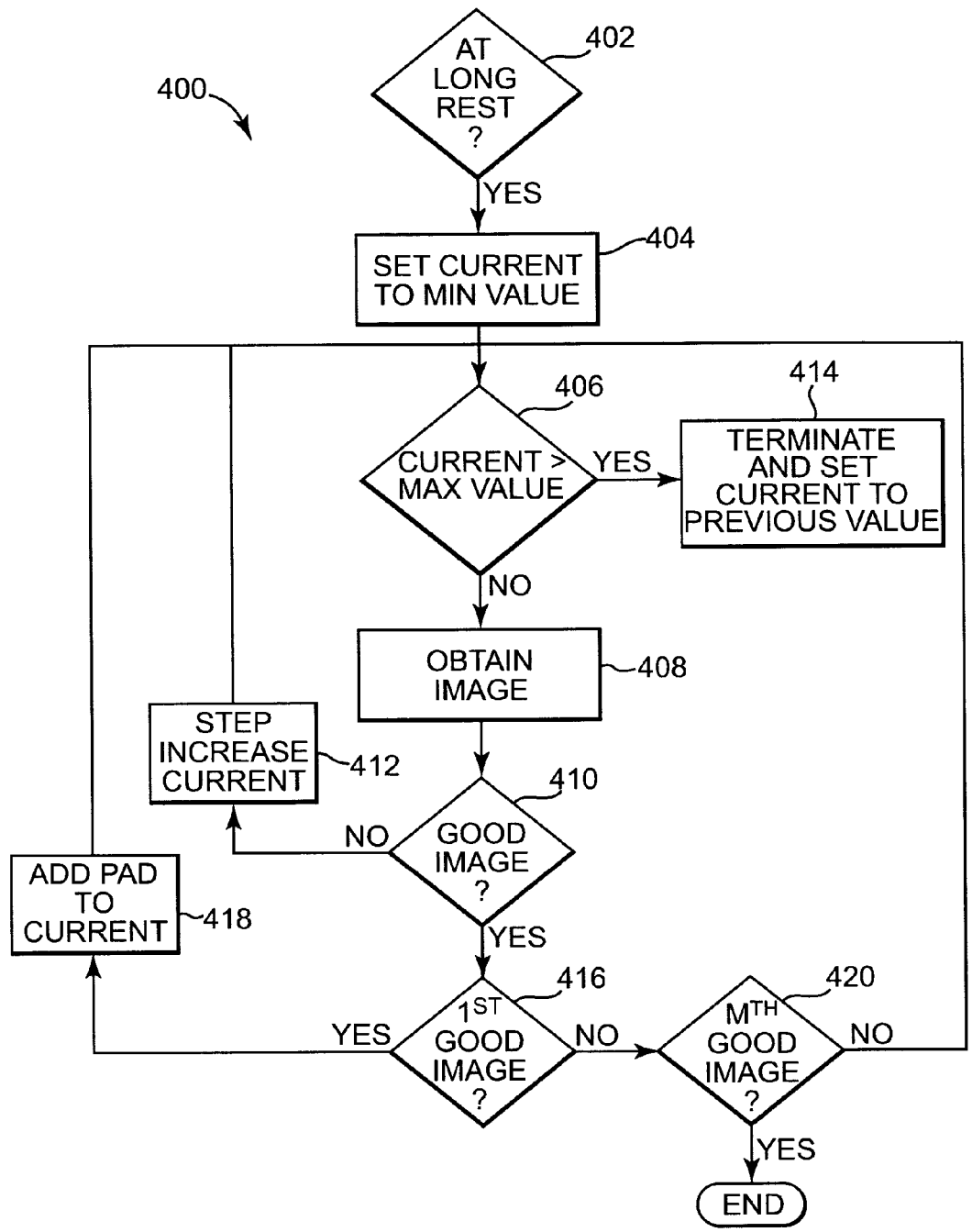
FIG. 4 is a flow diagram illustrating one embodiment of a full recalibration process for providing drive current to a light source in an optical pointing device.

One embodiment of a full recalibration process performed by navigation processor 108 is illustrated generally at 400 in FIG. 4. At 402, the full recalibration process is started after a suitable time that optical pointing device 100 has been at a long rest which is selected to avoid disrupting the user of the optical pointing device. In one example embodiment, full recalibration process 400 is started by navigation processor 108 after optical pointing device 100 has been at rest for a reasonable long period of time, such as approximately 10 minutes or other suitable time.

At 404, after the suitable long rest time, the drive current value is set to a minimum current value. At 406, navigation processor 108 determines if the drive current value is greater than the maximum current value. In the first pass through process 400, the drive current value is set to the minimum current value at 404 so the drive current value is not greater than the maximum current value and process 400 proceeds to 408.

At 408, the digital image is obtained with the minimum current value. The minimum current value produces light 122 which is reflected off navigation surface 124 onto photodetector array 114. As described above, photodetector array 114 provides signals to ADC 112 which vary in magnitude based upon the intensity of light incident on the corresponding photodetectors. ADC 112 converts the signals into digital values representing a digital image which are provided to navigation processor 108.

At 410, navigation processor 108 determines if the digital image provided by ADC 112 is a good image. In one embodiment similar to initial self-calibration process 300, this determination of image quality is based upon a navigation suitability measurement and a maximum pixel value measurement, both of which are derived from the pixels in the image array stored in memory 111.

In one embodiment, if either the navigation suitability measurement of the obtained image is less than the navigation suitability threshold value or the maximum pixel value measurement of the obtained image is less than the maximum pixel threshold value, the obtained image is determined to be a bad image at 410 and full recalibration process 400 proceeds to 412. At 412, the drive current value is increased by a step current value. At 406, if the increased drive current value is greater than the maximum current value, process 400 proceeds to 414. At 414, full recalibration process 400 is terminated and the drive current is set to the previous drive current value taken from when process 400 was entered. At 406, if the drive current value is less than or equal to the maximum current value, process 400 proceeds to 408 to obtain an image with the increased drive current.

At 410, if neither the measured navigation suitability of the obtained image is less than the navigation suitability threshold value nor the measured maximum pixel value of the obtained image is less than the maximum pixel value, the obtained image is determined to be a good image and process 400 proceeds to 416.

At 410 in other embodiments, other pixel statistics other than or in addition to the measured maximum pixel value of the digital image can be employed to measure image quality to determine if the obtained image is a good image, such as a measured average pixel value of the digital image, a measured minimum pixel value of the digital image, and/or a measured pixel ratio value of the digital image.

At 416, navigation processor 108 determines if the good image is the first good image. If the image is the first good image, at 418, the drive current value is set to the drive current plus a current pad value to avoid just clearing the threshold current of light source 118. At 406, navigation processor 108 determines if the new drive current value set at 418 is greater than the maximum current value. If the drive current value is greater than the maximum current value, full recalibration process 400 proceeds to 414, where process 400 is terminated and the drive current is set to the previous drive current value taken from when process 400 was entered. If the drive current value is less than or equal to the maximum current value, process 400 returns to 408 to obtain an image with the padded drive current value.

If at 416, navigation processor 108 determines that the good image is not the first good image, process 400 continues to 420, where navigation processor 108 determines if the good image is the $M^{th}$ good image. If at 420, the good image is not the $M^{th}$ good image, process 400 returns to 406 where navigation processor 108 determines if the drive current value is greater than the maximum current value. If the drive current value is greater than the maximum current value, process 400 proceeds to 414, where process 400 is terminated and the drive current is set the previous drive current value taken from when process 400 was entered. If the drive current value is less than or equal to the maximum current value, process 400 returns to 408 to obtain an image with the drive current. If at 420, the good image is the $M^{th}$ good image, full recalibration process 400 ends.

In the above embodiment of full recalibration process 400, recalibration only happens once for each entry into the long rest period. In this embodiment, the full recalibration process can be performed again if optical pointing device 100 is reactivated and another long rest period is entered. Process 400 is a full recalibration process because it cycles through all available drive current values by cycling from the minimum current value to a suitable high current value which yields M consecutive good images. Other embodiments of a full recalibration process cycle through all available drive current values in other ways, such as from the maximum current value to a suitable low current value which yields M consecutive good images.

Figure 5:
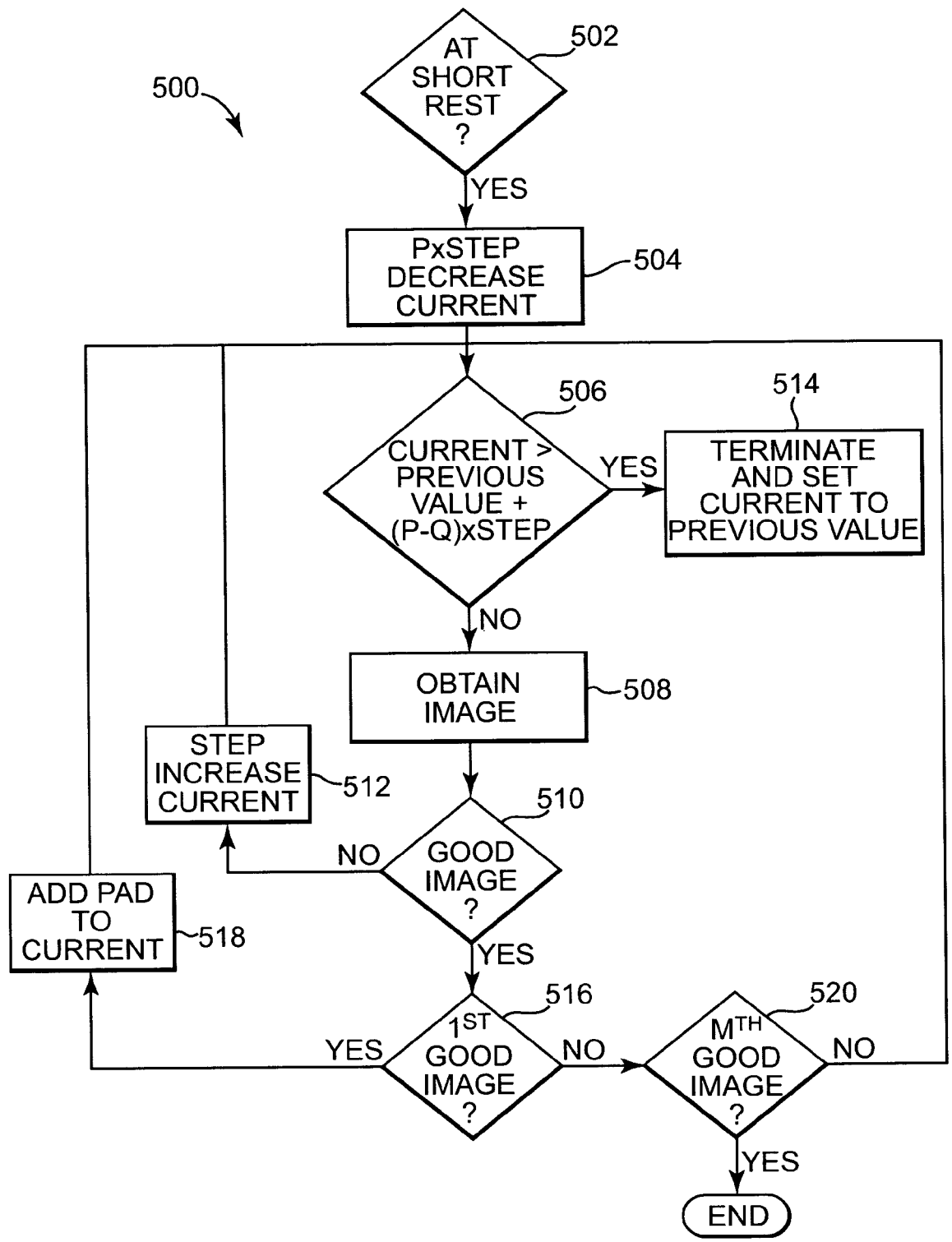
FIG. 5 is a flow diagram illustrating one embodiment of a partial recalibration process for providing drive current to a light source in an optical pointing device.

One embodiment of a partial recalibration process performed by navigation processor 108 is illustrated generally at 500 in FIG. 5. At 502, the full recalibration process is started after a suitable time that optical pointing device 100 has been at a short rest which is selected to be significantly shorter than the long rest time employed as a threshold to enter full recalibration process 400. In one example embodiment, partial recalibration process 500 is started by navigation processor 108 after optical pointing device 100 has been at rest for a reasonable short period of time, such as approximately 10 seconds or other suitable time.

At 504, after the suitable short rest time, the drive current value is set to [drive current−P×step current value]. At 506, navigation processor 108 determines if the drive current value is greater than [previous current value+(P−Q) ×step current value], where the previous drive current value is taken from when process 500 was entered. In one embodiment, P is greater than Q. In the first pass through process 500, the drive current value is set to [drive current−P×step current value] at 504 so the drive current value is not greater than [previous current value+(P−Q)×step current value] and process 500 proceeds to 508.

At 508, the digital image is obtained with [drive current−P×step current value], which produces light 122 which is reflected off navigation surface 124 onto photodetector array 114. As described above, photodetector array 114 provides signals to ADC 112 which vary in magnitude based upon the intensity of light incident on the corresponding photodetectors. ADC 112 converts the signals into digital values representing a digital image which are provided to navigation processor 108.

At 510, navigation processor 108 determines if the digital image provided by ADC 112 is a good image. In one embodiment similar to initial self-calibration process 300, this determination of image quality is based upon a navigation suitability measurement and a maximum pixel value measurement, both of which are derived from the pixels in the image array stored in memory 111.

In one embodiment, if either the navigation suitability measurement of the obtained image is less than the navigation suitability threshold value or the maximum pixel value measurement of the obtained image is less than the maximum pixel threshold value, the obtained image is determined to be a bad image at 510 and partial recalibration process 500 proceeds to 512. At 512, the drive current value is increased by the step current value. At 506, if the increased drive current value is greater than [previous current value+(P−Q)×step current value], process 500 proceeds to 514. At 514, partial recalibration process 500 is terminated and the drive current is set to the previous drive current value taken from when process 500 was entered. At 506, if the drive current value is less than or equal to [previous current value+(P−Q)×step current value], process 500 proceeds to 508 to obtain an image with the increased drive current.

At 510, if neither the measured navigation suitability of the obtained image is less than the navigation suitability threshold value nor the measured maximum pixel value of the obtained image is less than the maximum pixel value, the obtained image is determined to be a good image and process 500 proceeds to 516.

At 510 in other embodiments, other pixel statistics other than or in addition to measured maximum pixel value of the digital image can be employed to measure image quality to determine if the obtained image is a good image, such as a measured average pixel value of the digital image, a measured minimum pixel value of the digital image, and/or a measured pixel ratio value of the digital image.

At 516, navigation processor 108 determines if the good image is the first good image. If the image is the first good image, at 518, the drive current value is set to the drive current plus a current pad value to avoid just clearing the threshold current of light source 118. At 506, navigation processor 108 determines if the new drive current value set at 518 is greater than [previous current value+(P−Q)×step current value]. If the drive current value is greater than [previous current value+ (P−Q)×step current value], partial recalibration process 500 proceeds to 514, where process 500 is terminated and the drive current is set to the previous drive current value taken from when process 500 was entered. If the drive current value is less than or equal to [previous current value+(P−Q)×step current value], process 500 returns to 508 to obtain an image with the padded drive current value.

If at 516, navigation processor 108 determines that the good image is not the first good image, process 500 continues to 520, where navigation processor 108 determines if the good image is the $M^{th}$ good image. If at 520, the good image is not the $M^{th}$ good image, process 500 returns to 506 where navigation processor 108 determines if the drive current value is greater than [previous current value+(P−Q)×step current value]. If the drive current value is greater than [previous current value+(P−Q)×step current value], process 500 proceeds to 514, where process 500 is terminated and the drive current is set the previous drive current value taken from when process 500 was entered. If the drive current value is less than or equal to [previous current value+(P−Q)×step current value], process 500 returns to 508 to obtain an image with the drive current. If at 520, the good image is the $M^{th}$ good image, partial recalibration process 500 ends.

In the above described embodiment of partial recalibration process 500, partial recalibration only happens once on each entry into the short rest period. In this embodiment, partial recalibration process 500 can be entered again after optical pointing device 100 is reactivated and another short rest period is entered. Partial recalibration process 500 is entered after a significantly shorter rest time then the long rest time employed as a threshold to enter full recalibration process 400 (e.g., one example short rest period is equal to 10 seconds). However, partial recalibration process 500 only considers possible drive current values from [(previous drive current−P×step current value)+current pad value] to [(previous current value+(P−Q)×step current value)+step current value)+current pad value]. For illustrative purposes, in an example embodiment where P is equal to 5, Q is equal to 2, and the current pad value is equal to the step current value, nine drive current values are potentially considered to obtain a good image (i.e., previous drive current−4 steps, previous drive current−3 steps, previous drive current−2 steps, previous drive current−1 step, previous drive current, previous drive current+1 step, previous drive current+2 steps, previous drive current+3 steps, and previous drive current+4 steps).

The above initial self-calibration process 300, full recalibration process 400, and the partial recalibration process 500 and other embodiments of suitable self-calibration processes can be implemented without programmable non-volatile memory or without calibration during the manufacturing of optical pointing device 100. In addition, the calibration embodiments can be repeated on any navigation surface where the optical pointing device is being employed. Embodiments of the recalibration processes mitigate operating temperature affects on the light source of the optical pointing device. Moreover, all of the above-described embodiments can provide for simplified manufacturing processes resulting in reduced optical pointing device product costs and product test times.

In the above described embodiments, self-calibration process 300, full recalibration process 400, partial recalibration process 500, the control of light source pulse mode operation, and the operating mode adjustments of drive current are implemented in navigation processor 108 of optical pointing device 100. In other embodiments, a processor external to navigation sensor IC 102 obtains image statistics from navigation sensor 102 and performs drive current controller functions instead of or in addition to navigation processor 108 performing drive current controller functions. In one embodiment, light source driver 116 is external to navigation sensor IC 102. It will be understood by a person of ordinary skill in the art that these current control functions and other functions performed by optical pointing device 100 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory (RAM).

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. An optical pointing device, comprising:
a light source driver configured to provide a pulsed drive current;
a light source operably connected to the light source driver and configured to respond to the pulsed drive current by providing a sequence of light pulses to illuminate an imaging surface and thereby generate a corresponding sequence of images reflected from the imaging surface;
a photodetector array configured to sense the image sequence as a corresponding sequence of analog signal arrays;
an analog-to-digital (A/D) converter operably connected to the photodetector array and configured to convert the analog signal array sequence into a corresponding arrays of digital values;
a navigation processor operably connected to the A/D converter and the light source driver, the processor being configured to store, in a memory, individual frames corresponding to the digital values and the sequence of images corresponding thereto, each frame comprising an array of pixel values, the navigation processor further being configured to process each frame at a frame rate and determine an image quality value corresponding to each frame based on at least one of a measured average pixel value of the frame, a measured minimum pixel value of the frame, a measured pixel ratio value of the frame, and a measured maximum pixel value of the frame, the navigation processor further being configured to control a duty cycle of the light source driver and at least one of a pulse amplitude and a pulse width of the pulsed drive current thereof on the basis of the image quality value determined for each frame, the duty cycle being synchronized with the frame rate.

2. The optical pointing device of claim 1, wherein the light source comprises a laser.

3. The optical pointing device of claim 1, wherein the light source comprises a vertical cavity surface emitting laser (VCSEL).

4. The optical pointing device of claim 1, wherein the light source comprises a broadband light source configured to provide broadband light, and a bandpass filter configured to filter the broadband light to provide the at least partially coherent light.

5. The optical pointing device of claim 1, wherein the navigation processor is further configured to determine whether an individual frame stored in the memory thereof represent a good image or a bad image based on the image quality value corresponding to such frame.

6. The optical pointing device of claim 1, wherein the navigation processor is configured to reduce the drive current when the photodetector array is saturated by reflected images.

7. The optical pointing device of claim 1, wherein the navigation processor is configured to calibrate the drive current after a reset condition occurs.

8. The optical pointing device of claim 7, wherein the navigation processor is configured to cycle through predetermined drive current values stored in the memory thereof until one of the drive current values results in a suitable quality image being produced.

9. The optical pointing device of claim 8, wherein the light source is at least partially coherent.

10. The optical pointing device of claim 1, wherein the navigation processor is configured to calibrate the drive current after a rest period of a predetermined period of time has elapsed.

11. The optical pointing device of claim 10, wherein the rest period is selected to be sufficiently long to avoid disrupting operation of the optical pointing device when the device is being employed by a user.

12. The optical pointing device of claim 10, wherein the navigation processor is configured to cycle through a plurality of predetermined drive current values stored in the memory thereof until one of the drive current values produces a suitable quality image.

13. The optical pointing device of claim 12 wherein the navigation processor is configured to set the drive current value to the drive current value corresponding to the end of the rest period and the beginning of the calibration if none of the predetermined drive current values produces a suitable quality image.

14. The optical pointing device of claim 10, wherein the navigation processor is configured to cycle through a selected number of drive current values until one of the drive current values produces a suitable quality image, wherein the selected number is less than all the predetermined drive current values stored in the memory.

15. The optical pointing device of claim 14, wherein the navigation processor is configured to set the drive current value to the drive current value corresponding to the end of the rest period and the beginning of the calibration if none of the drive current values produces a suitable quality image.

16. The optical pointing device of claim 1, wherein the navigation processor includes at least one of the light source driver and a drive current controller.

17. The optical pointing device of claim 1 wherein at least one of the light source driver and a drive current controller is external to the navigation processor.

18. A method of operating an optical pointing device comprising a light source driver configured to provide a pulsed drive current, a light source operably connected to the light source driver and configured to respond to the pulsed drive current by providing a sequence of light pulses to illuminate an imaging surface and thereby generate a corresponding sequence of images reflected from the imaging surface, a photodetector array configured to sense the image sequence as a corresponding sequence of analog signal arrays, an analog-to-digital (A/D) converter operably connected to the photodetector array and configured to convert the sequence of analog signal arrays into a corresponding sequence of digital array values, a navigation processor operably connected to the A/D converter and the light source driver, the processor being configured to store, in a memory, individual frames corresponding to the digital array values and the sequence of images corresponding thereto, each frame comprising an array of pixel values, the navigation processor further being configured to process each frame at a frame rate and determine an image quality value corresponding to each frame based on at least one of a measured average pixel value of the frame, a measured minimum pixel value of the frame, a measured pixel ratio value of the frame, and a measured maximum pixel value of the frame, the navigation processor further being configured to control a duty cycle of the light source driver and at least one of a pulse amplitude and a pulse width of the pulsed drive current thereof on the basis of the image quality value determined for each frame, the duty cycle being synchronized with the frame rate, the method comprising:

providing the pulsed drive current to the light source;

illuminating the imaging surface with the sequence of light pulses;

sensing the sequence of images reflected from the imaging surface with the photodetector array and generating the corresponding sequence of arrays of analog signals;

converting the sequence of arrays of analog signals into the corresponding sequence of digital value arrays;

storing, in the memory of the navigation processor, the individual frames corresponding to the digital array values;

processing the pixel values of the individual frames to determine an image quality value for each frame;

controlling the duty cycle of the light source driver on the basis of the image quality values determined for each frame; and synchronizing the duty cycle with the frame rate.

19. The method of claim 18, further comprising calibrating the pulsed drive current on the basis of the image quality values.

20. The method of claim 18, further comprising the light source providing at least partially coherent light.

21. The method of claim 18, further comprising providing a laser as the pulsed light source.

22. The method of claim 18, further comprising providing a vertical cavity surface emitting laser (VCSEL) as the pulsed light source.

23. The method of claim 18, further comprising bandpass filtering the pulsed light source.

* * * * *